Sept. 8, 1953  H. M. NOYES  2,651,402
ASSORTING AND FORWARDING MECHANISM
Filed March 8, 1951  2 Sheets-Sheet 1
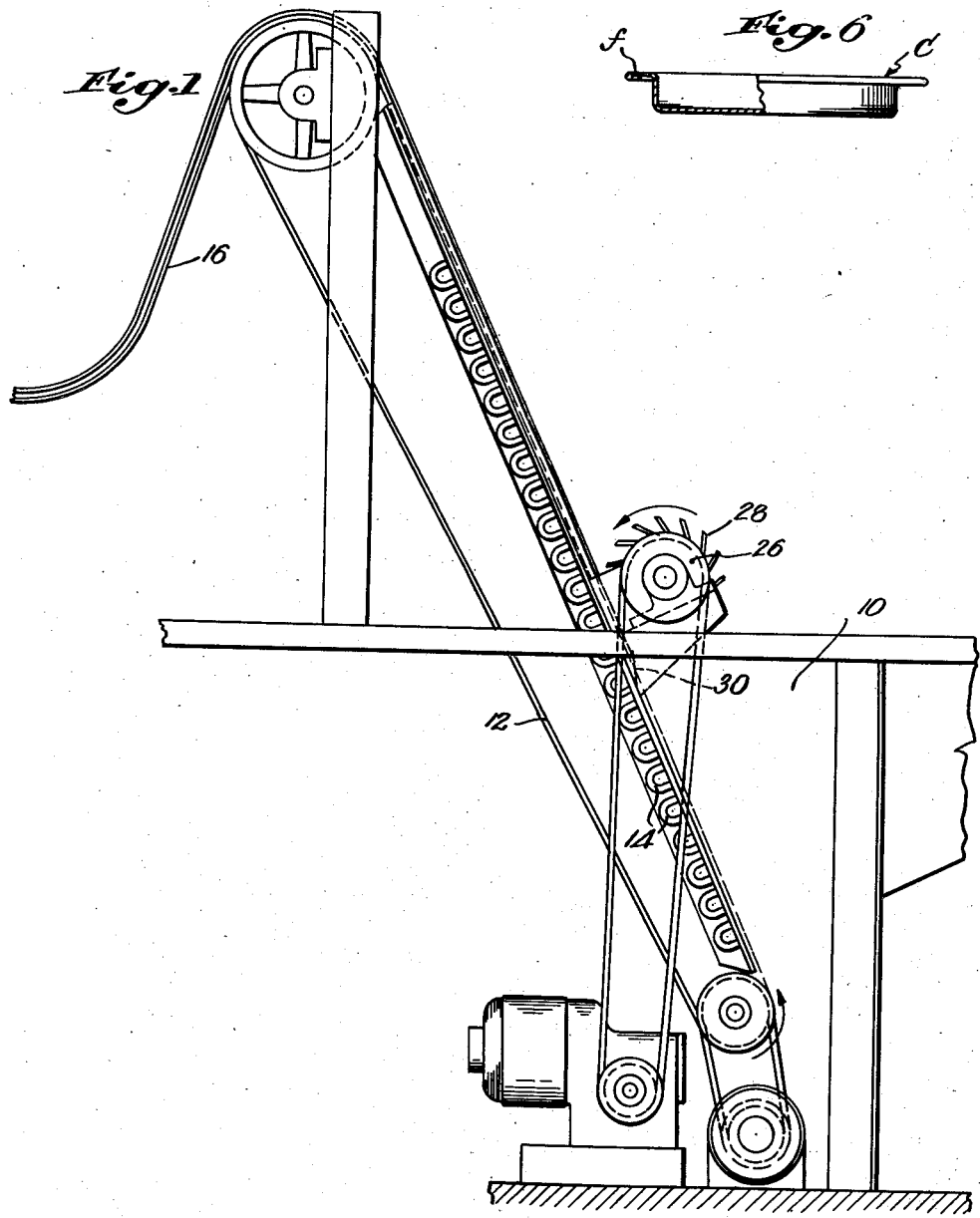

Sept. 8, 1953 H. M. NOYES 2,651,402
ASSORTING AND FORWARDING MECHANISM
Filed March 8, 1951 2 Sheets-Sheet 2
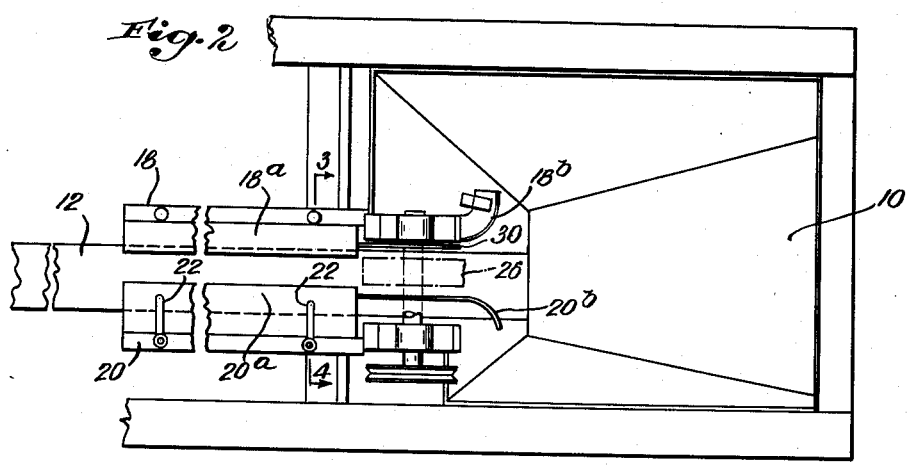
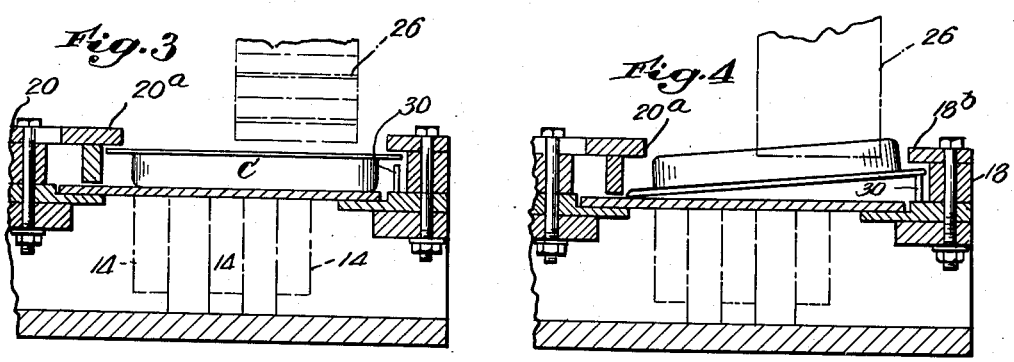
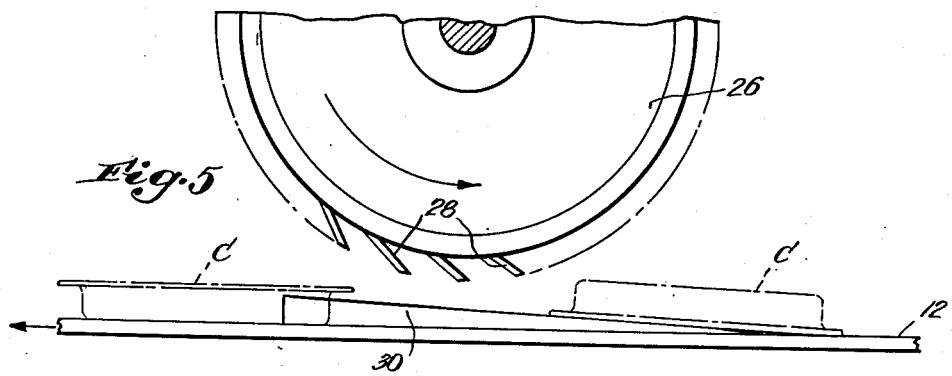
Inventor
Harold M. Noyes Patented Sept. 8, 1953

2,651,402

UNITED STATES PATENT OFFICE 2,651,402

ASSORTING AND FORWARDING MECHANISM

Harold M. Noyes, Claremont, N. H., assignor to Expellid Corporation, Dover, N. H., a corporation of New Hampshire Application March 8, 1951, Serial No. 214,597

2 Claims. (Cl. 198—30)

This invention relates to a mechanism for the handling of parts which have the form of a cup with an outwardly extending flange about its mouth such as, for example, are used as closures for so-called friction top cans. The object is to provide an efficient mechanism whereby such covers are drawn from a miscellaneous mass and arranged in file, with the same side up, for delivery to some mechanism for further operation thereon, or for utilizing the same.

My invention will be well understood by reference to the following description taken in connection with the accompanying drawings wherein—

Fig. 1 is a side elevation of the mechanism;

Fig. 2 is a partial plan view thereof;

Figs. 3 and 4 are sections with parts omitted, and show respectively a cover which is travelling open side up and open side down;

Fig. 5 is a schematic view showing certain parts of the mechanism; and

Fig. 6 is an elevation partly broken away, showing one of the covers.

Fig. 6 shows a cover C such as is handled by the mechanism shown in the other figures and discloses its slightly tapered cup-like body with the peripheral flange $f$ at its open end.

Coming now to the mechanism, at the left of Figs. 1 and 2 there is shown a hopper 10 adapted to have dumped therein a miscellaneous mass of covers, the hopper having converging walls tending to deliver covers at the lower left-hand portion of the hopper viewing Fig. 1. In the example shown the covers are raised from the hopper on a conveyor belt 12 and delivered at the upper end thereof to a raceway 14 down which they gravitate to be delivered one by one to a place of use. The belt 12 is a portion of a conveyor mechanism of the magnetic type and herein comprises the endless belt proper 12 of flexible, non-magnetic material, the upper run of which forms a portion of the wall of the hopper, extending upwardly from the lower left-hand end of the bottom of the hopper viewing Fig. 1 and beyond the same. Beneath the belt is a series of permanent magnets 16 which attract the covers C in the hopper and cause them to adhere to a travelling belt, the covers passing from the field of one magnet to the next as the belt moves.

Referring now to Fig. 2, adjacent the top of the hopper is a passageway comprising a fixed guide 18 substantially aligned with one edge of belt 12 and a cooperating adjustable guide 20, the adjustment indicated by the slots 22 seen in Fig. 2 providing for use of the mechanism with covers of different diameters. As seen for instance in Fig. 3, the covers C can travel between these guides and the latter have overhanging flanges 18a and 20a to overlie the flanges $f$ of the cover. At the lower ends of the guides there are provided divergent guiding portions 18b and 20b for a purpose to be described. Adjacent the top of the hopper and between the two guides 18 and 20 near their intake ends, but in advance of the ends of the flanges 18a and 20a, is a rotating "paddle wheel" 26 having vanes 28 which sweep downwardly adjacent the intake ends of the passageway at a distance somewhat greater than the altitude of a cover C.

It is desired to carry the covers with their open or flanged bases outwardly, to be delivered at the end of the raceway 14 with that face up so that they will be delivered from the raceway in the position shown in Fig. 6.

The covers in the hopper 10 may be thrown against the lower portion of the belt 12 in any position along the portion below the top of the hopper where the belt in effect forms a part of the wall of the hopper. If they strike edgewise they are unlikely to be attracted and are easily displaced to fall back into the hopper. If they contact the belt flatwise they are held against the belt and move upwardly with it. They are moved across the face of the belt by the guides 18a and into general alignment with the passageway between the guides 18 and 20. In practice little difficulty has been encountered with what may be called pick a back riders, that is, where one cover adheres to the belt and another to it, but if two covers advance up the belt in this way the upper one will be struck by the vanes 28 of the rotating paddle wheel and one or both of the covers will be displaced and return to the hopper. However, obviously the chances are approximately even whether or not the other face of a cover is against the belt. Means therefore are provided for rejecting those which lie with the flange down. For this purpose an inclined member 30 is provided adjacent the guideway 18 as seen in Figs. 3, 4 and 6, the greatest height of which is less than the distance between the bottom of the cover and its flange. Its position is near guide 18 so that it will miss the cup-shaped body of a cover C the flange of which is moving along that guide. If the cover is right side up, as seen in Fig. 3, its flange will therefore pass freely over this incline and the cover will be delivered beyond the same as seen at the left of Fig. 5. On the other hand if the flange is down it will ride up on the incline as seen in Fig. 4 and lift a portion of the cover into the path of the vanes of the paddle wheel 28 as indicated in that figure and the cover will be struck by the same and thrown back into the hopper. At the right of Fig. 5 a cover in this position is shown advancing toward the incline 30 and the operation of the incline will be clearly understood from that figure.

The covers accumulate in raceway 14 and are delivered at the bottom end thereof under the gravitational "head" of the file so accumulated.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. Mechanism for assorting and forwarding cup-like elements having an outwardly extending peripheral flange comprising a conveyor belt, magnetic means for retaining the elements on the belt, lateral guides cooperating with a portion of the belt to define a passageway for a file of such elements, means for haphazardly delivering elements to the belt in advance of such passageway, means on the belt for moving such elements into at least approximate alignment with the entrance to such passageway, an inclined member in the plane of the path of a laterally extending portion of the flange of a so aligned member and of a height to miss the said flange if the bottom of the cup is on the belt and a knock-off device moving in spaced relation to the belt adjacent said member to strike and knock off an element the flange of which was on the belt to be engaged by said inclined member with resultant lifting of the element into the path of said knock-off device.

2. Mechanism for selecting and diverting from a moving file of cup-like elements having an outwardly extending peripheral flange those having the flange down comprising a knock-off device moving above the file at a distance somewhat greater than the depth of the elements and an inclined member in the plane of the laterally extending portions of the flanges of the element said member being of a height to permit free passage between the same and the knock-off device of the flange of an element the bottom of which is down and to lift the flange of an element the bottom of which is up to raise said element into the path of the knock-off device.

HAROLD M. NOYES.

References Cited in the file of this patent

UNITED STATES PATENTS

| Number | Name | Date |
| --- | --- | --- |
| 1,644,999 | Hardiman | Oct. 11, 1927 |
| 1,773,646 | Skov | Aug. 19, 1930 |
| 1,908,855 | Makenny | May 16, 1933 |
| 1,983,471 | Kramer | Dec. 4, 1934 |